(12) United States Patent
Griesmer et al.

(10) Patent No.: US 8,817,962 B2
(45) Date of Patent: Aug. 26, 2014

(54) INTUITIVE SYSTEM, METHOD AND COMPUTER-READABLE MEDIUM FOR ACCESSING CUSTOMER SUPPORT

(75) Inventors: Stephen J. Griesmer, Westfield, NJ (US); James Gordon Beattie, Jr., Bergenfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1256 days.

(21) Appl. No.: 12/262,547

(22) Filed: Oct. 31, 2008

(65) Prior Publication Data

US 2010/0111277 A1 May 6, 2010

(51) Int. Cl.
*H04M 3/42* (2006.01)

(52) U.S. Cl.
USPC .................. 379/201.1; 379/201.3; 379/265.1

(58) Field of Classification Search
USPC .............. 379/201.01, 201.03, 265.01–265.14
See application file for complete search history.

(56) References Cited

U.S. PATENT DOCUMENTS

| | | | | |
|---|---|---|---|---|
| 6,115,040 A * | 9/2000 | Bladow et al. | ................ | 715/741 |
| 6,607,136 B1 * | 8/2003 | Atsmon et al. | ................ | 235/492 |
| 7,148,979 B1 * | 12/2006 | Yanagawa | ..................... | 358/1.15 |
| 7,593,990 B2 * | 9/2009 | Himmel et al. | ............... | 709/206 |
| 7,643,435 B1 * | 1/2010 | Chang | ........................... | 370/259 |
| 7,937,491 B1 * | 5/2011 | Ng | .................. | 709/238 |
| 8,069,266 B2 * | 11/2011 | Schwimer | ...................... | 709/241 |
| 2002/0029268 A1 * | 3/2002 | Baca et al. | ..................... | 709/224 |
| 2003/0030844 A1 * | 2/2003 | Matsui | ......................... | 358/1.15 |
| 2003/0074342 A1 * | 4/2003 | Curtis | ............................ | 707/1 |
| 2003/0187978 A1 * | 10/2003 | Nakamura et al. | ............. | 709/224 |
| 2004/0157592 A1 * | 8/2004 | Lipton et al. | ................... | 455/415 |
| 2005/0180395 A1 * | 8/2005 | Moore et al. | .................. | 370/352 |
| 2005/0259682 A1 * | 11/2005 | Yosef et al. | ................... | 370/468 |
| 2006/0126600 A1 * | 6/2006 | Choo et al. | ..................... | 370/352 |
| 2006/0218629 A1 * | 9/2006 | Pearson et al. | ..................... | 726/8 |
| 2007/0022479 A1 * | 1/2007 | Sikdar et al. | ..................... | 726/22 |
| 2007/0260705 A1 * | 11/2007 | Armstrong et al. | ........... | 709/217 |
| 2008/0002820 A1 * | 1/2008 | Shtiegman et al. | ....... | 379/211.02 |
| 2009/0132632 A1 * | 5/2009 | Jackson et al. | ................ | 709/201 |
| 2009/0144447 A1 * | 6/2009 | Wittig et al. | .................. | 709/245 |
| 2010/0050243 A1 * | 2/2010 | Hardt | ................. | 726/6 |

* cited by examiner

*Primary Examiner* — William Deane, Jr.
(74) *Attorney, Agent, or Firm* — Greenblum & Bernstein, P.L.C.

(57) ABSTRACT

A system for providing user support includes a setter configured to set up at least one communication service for a user including providing a unique communication identifier of character strings to access the communication services, and an accessor configured to access customer support including providing a unique customer support identifier character string to the user, the customer support identifier character string comprising at least a portion of the unique communication identifier character string.

25 Claims, 6 Drawing Sheets

INTUITIVE SYSTEM, METHOD AND COMPUTER-READABLE MEDIUM FOR ACCESSING CUSTOMER SUPPORT

BACKGROUND

1. Field of the Disclosure

The present disclosure relates to the field of communications. More particularly, the present disclosure relates to an intuitive system, method and computer-readable medium for accessing customer support.

2. Background Information

Customers or users may contact communication providers under a variety of circumstances. When a new user wishes to order communication services from a provider, the user may contact the provider for such communication services of interest. When an existing customer wishes to order additional communication services of interest, inquire about existing communication services, or inquire about communication services ordered but not yet provided, the user must typically contact the provider.

Traditionally, when a customer or user purchases communication services, there is often some delay between when the user purchases these services and when such services are implemented. Such communication services may include cellular telephone services, landline telephone services, internet services and the like.

For example, when a user purchases landline or wireless telephone services from a service provider, there is often a delay between when a user registers for landline or wireless telephone services (and receives a telephone number), and when such telephone service is activated. Similarly, there is often a delay between when a user registers for internet (including VoIP, or Voice-over-Internet protocol, telephony) services (and receives a username and/or email address), and when internet service is activated. This delay is often referred to as a pending service order period.

When a new user with a pending service order needs to contact the service provider for pre-service customer care matters, the user may call a customer or user support phone number, or emails a customer support email address. Pending service orders may include a service order for wireless telephone, landline telephone, internet and the like. Customer care matters may include billing questions, scheduling matters, additional or changes to service, and the like.

DETAILED DESCRIPTION

Figure 1:
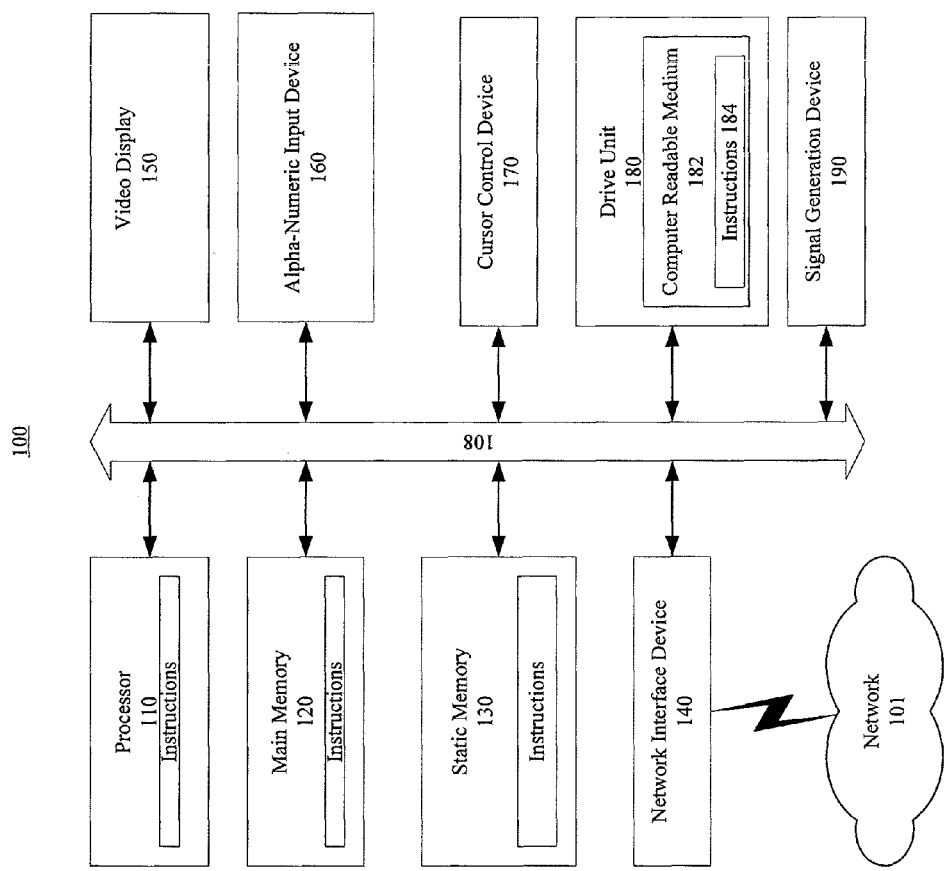
FIG. 1 shows an exemplary general computer system that includes a set of instructions for accessing customer support.

In view of the foregoing, the present disclosure, through one or more of its various aspects, embodiments and/or specific features or sub-components, is thus intended to bring out one or more of the advantages as specifically noted below.

A non-limiting feature of the present disclosure provides system for providing customer or user support including a setter configured to set up at least one communication service for a user by providing a unique communication identifier character string to access the at least one communication service, and an accessor configured to access user support including providing a unique user support identifier character string to the user, the user support identifier character string including at least a portion of the unique communication identifier character string.

In another feature of the disclosure the at least one communication service may include internet access, and the unique communication identifier character string may include at least a username of the user's email address.

In a further feature, the unique user support identifier character string may be a Uniform Resource Locator (URL).

In an additional feature, the unique user support identifier character string may be an email address different from the user's email address.

In another feature, the at least one communication service may include telephone services, and the unique communication identifier character string may include the user's telephone number.

In yet another feature, the unique user support identifier may be an email address.

In yet still another feature, the unique user support identifier may be the same as the user's telephone number.

In a further feature, the user support identifier character string may include the entire unique communication identifier character string.

Another non-limiting feature of the present disclosure provides a method of providing user support including setting up at least one communication service for a user and providing a unique communication identifier of character string to access the at least one communication service, and accessing user support including providing a unique user support identifier of character string to the user, the user support identifier of character string including at least a portion of the unique communication identifier character string.

In a further feature, the unique user support identifier represent a resource available on network.

In still another feature, the unique user support identifier may be an electronic mail address.

In yet another feature, the unique user support identifier may be the same as the user's telephone number.

In yet still another feature, during a first period of time after the setting up of the at least one communication service, directing a caller to user support upon calling the user's telephone number may be performed, and during a second period of time after the first period of time, providing a menu to the caller may be performed, the menu including a list of options including connecting to user support.

A further feature of the disclosure may include forwarding, to the user, a response to the accessing via at least one of short message service (SMS), pager, telephone or email.

In yet another feature, the response may be automated.

In still a further feature, the user support identifier character string may include the entire unique communication identifier character string.

In another feature, the unique communication identifier character string may include the user's entire email address.

In an additional feature, the telephone services may include providing at least one of wireless telephony, landline telephony, voice-over-internet-protocol (VoIP) telephony.

Another non-limiting feature of the present disclosure provides a computer readable medium for storing a computer program that provides user support. The medium may include a setting code segment that sets up at least one communication service for a user by providing a unique communication identifier character string to access the at least one communication service, and an accessing code segment that accesses user support by providing a unique user support identifier character string to the user, the user support identifier character string comprising at least a portion of the unique communication identifier character string.

In another feature, the at least one communication service may include voice communication services, the voice communication services including at least one of wireless telephony, landline telephony and voice-over-internet-protocol (VoIP) telephony, and the unique communication identifier character string may include the user's telephone number.

Referring to the drawings wherein like characters represent like elements, FIG. 1 is an illustrative embodiment of a general computer system, on which an intuitive system, method and computer-readable medium for accessing customer or user support can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a satellite telephone, a landline telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions. As used throughout the specification, the terms "cellular," "wireless" and "mobile" to describe telephones are broadly used interchangeably. In other words, such terms may describe any mobile communication device capable of wirelessly transmitting voice.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, such as software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device (NID) 140.

The computer system 100 allows the user (also referred to as a "caller" or "customer") to access the intuitive system, method and computer-readable medium for accessing customer support. It should be appreciated by those of skill in the art that the term "customer support" (or "customer care") as used herein can be any myriad systems and methods to provide assistance to a user and can be anyone or any system within or external to the provider used to interact with a user, including human manned assistance and computer-based assistance (including Interactive Voice Response, or IVR and the like), either of both of which may be provided in real time or on a delayed message-based system. Such message-based system may include email or Short Message Service (SMS). It is also appreciated that the customer support may be provided via an artificial intelligence (AI)-based custom webpage generator and/or Graphical User Interface (GUI)-based messaging clients, such as ICQ.

A non-limiting embodiment of the present disclosure adaptively uses all or part of a telephone number, username and/or email address as a key to access customer support for virtually any type or combination of provider services, regardless of delivery state regardless of whether the service order is pending or already activated.

Following the completion of the initial service order entry (either immediately or after a predetermined period of time), a phone number, email address and/or username is assigned to the customer and appropriate service elements are automatically put into place to support customer care access. Services include landline telephone, VoIP telephone, wireless telephone and/or Internet service, either stand-alone, or as part of an extended bundle of services including combinations of telephony, Internet, video and mobility.

Figure 2:
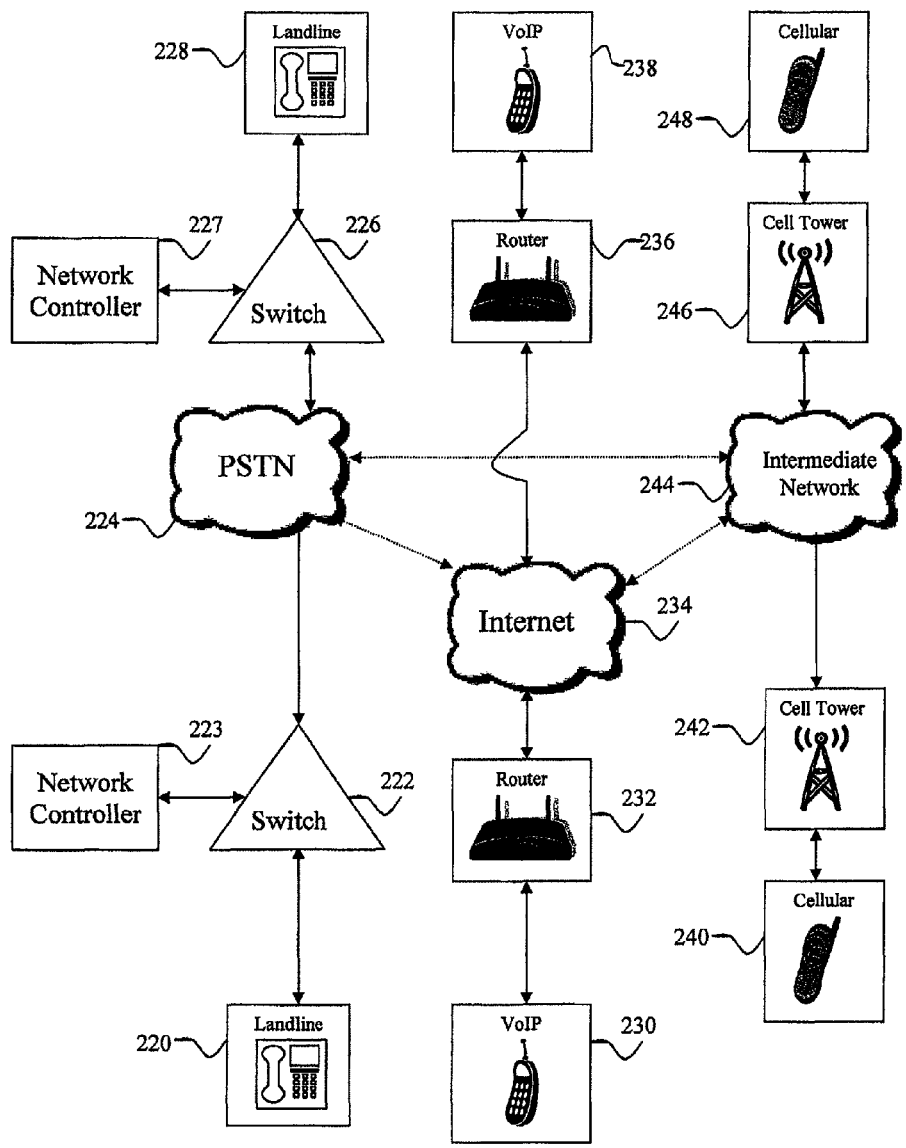
FIG. 2 shows an exemplary general telephone system that includes a set of instructions for accessing customer support, according to an aspect of the present disclosure.

For example, once provided with a phone number, email address and/or username, a user may access the network 101 (which may include any combination of Public Switched Telephone Network (PSTN) 224, internet 234 and/or intermediate network 244 of FIG. 2) via input device 160 and/or cursor control device 170 to access a service provider URL (Uniform Resource Locator) or other network-enabled resource.

Should the user desire to contact customer support and not desire to navigate through the usual pages of a provider's website, the user would access a unique service provider URL (or other network-enabled resource) which may include all or part of a telephone number, username and/or email address. In this way, the unique URL is adaptively created for the user on a custom, personalized basis. For example, the URL may include the user's username, such as http://www.username.providerdomain.net (or .com or other top level domain (TLD)) or alternatively or additionally include other suitable identifiers. If the user's name is Alec Andrews, his username may be registered as "aandrews" and the user's associated email address is aandrews@att.net. As an example of a customized, unique, personalized customer support webpage URL, the user could input the URL as http://www.aandrews.att.net or http://www.aandrews.attcustomercare.net or http://www.aandrews.customercare.att.net, to access the adaptively-created unique customer support webpage. Similarly, the user may use all or part of his/her telephone number to access such a webpage, such as http://www.N-PANXXXXXX.providerdomain.net or (in smaller service areas) http://www.NXXXXXX.providerdomain.net. Additionally, according to a further non-limiting aspect, the "www" portion of the URL may be absent (such as http://NPANXXXXXX.providerdomain.net) or may include one or more alternative characters, which may provide guidance as to which service element is to be accessed (such as http://support.NPANXXXXXX.providerdomain.net). Once the unique webpage has been accessed, the user may be presented with information tailored to his/her unique customer support requirements.

Figure 3:
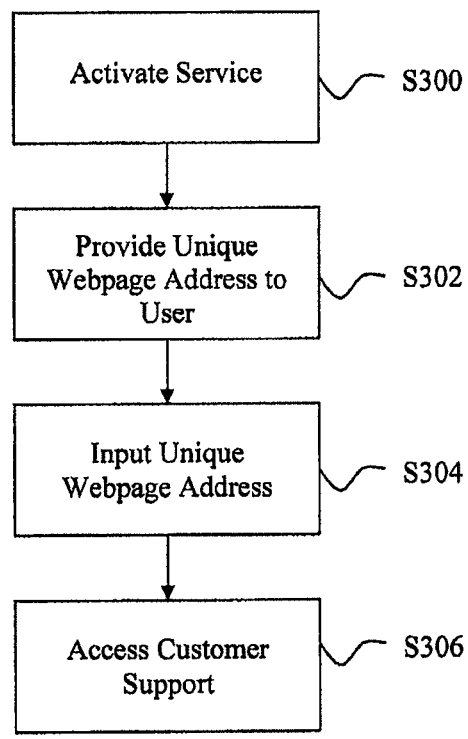
FIG. 3 shows a flowchart of a method of contacting a customer service, according to a first aspect of the present disclosure.

FIG. 3 shows a flowchart indicating how such a page may be accessed by a user. At step S300 the user signs up for any of the above-mentioned services and at step S302 is thereafter provided with the above-mentioned personalized, unique webpage URL or web address. At this point the above-mentioned services are set up. Such setup may be performed by a setter, which is preferably located in the processor 110 (shown in FIG. 1), although those of skill in the art should appreciate that any suitable element separate from or in addition to a setter may be used, and should also appreciate that the setter may be positioned in any suitable location separate from or in addition to the processor 110. At step S304, the user inputs the unique webpage URL or web address. At step S306, the unique webpage is loaded, whereupon the user accesses customer support. Such access may be performed by an accessor, which is preferably located in the processor 110 (shown in FIG. 1), although those of skill in the art should appreciate that any suitable element different from or in addition to the accessor may be used, and should also appreciate that the accessor may be positioned in any suitable location separate from or in addition to the processor 110.

It should be understood by those of skill in the art that such unique webpage may be provided immediately after registering for services or any time thereafter. The webpage may also be provided for the duration of the user's registration for services, or may be terminated/reassigned after a predetermined period of time.

As an alternative or in addition to providing the user with a unique webpage to access customer support, the user may be provided with a unique email address to be used to contact customer support to, for example, inquire about an issue or to obtain order status. This unique email address may include all or part of a telephone number, username and/or email address. For example, rather than contact customer support by sending an email to a generic email address such as help@providerdomain.net or support@providerdomain.net (which may take time to route to the appropriate party), the user may intuitively send an email to customer support using a unique, adaptive email address, such as username@support.providerdomain.net, support@username.providerdomain.net, NPANXXXXXX@support.providerdomain.net, or support@NPANXXXXXX.providerdomain.net. As discussed above, the NPA (number plan area) may be omitted in smaller service areas. It is also appreciated that rather than sending a traditional email message, customer support may be contacted (using an address including all or part of a telephone number, username and/or email address) via text (or SMS) messaging. As used herein, the term "email message" or "email address" shall also respectively refer to text (or SMS) messages or addresses.

Figure 4:
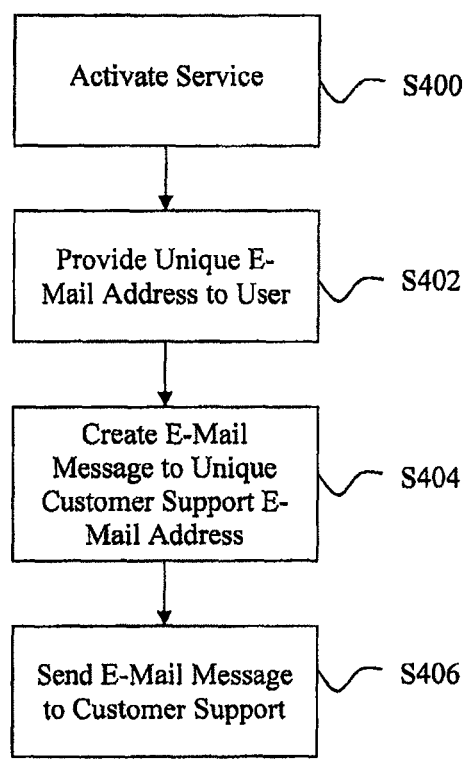
FIG. 4 shows a flowchart of a method of contacting a customer service, according to a second aspect of the present disclosure.

FIG. 4 shows a flowchart indicating how a user contacts customer support using such a system. At step S400 the user signs up for any of the above-mentioned services and at step S402 is thereafter provided with the above-mentioned personalized, unique email address. At this point, the above-mentioned services are set up. Such setup may be performed by a setter, which is preferably located in the processor 110 (shown in FIG. 1), although those of skill in the art should appreciate that any suitable element separate from or in addition to a setter may be used, and should also appreciate that the setter may be positioned in any suitable location separate from or in addition to the processor 110. At step S404, the user creates an email message using the unique email address. At step S406, the email message is sent to customer support. At this point the user accesses customer support. Such access may be performed by the accessor, which is preferably located in the processor 110 (shown in FIG. 1), although those of skill in the art should appreciate that any suitable element different from or in addition to the accessor may be used, and should also appreciate that the accessor may be positioned in any suitable location separate from or in addition to the processor 100.

Once the email is sent, an automated/robotic response (in the form of an email, telephone call, text message and the like) can be provided that will provide URLs that address specific services, topics or concerns through the generation of automatically generated reply email selectable by the user. Alternatively or additionally, a response (in the form of an email, telephone call, text message and the like) can be generated by a human being.

It should be understood by those of skill in the art that such unique email address may be provided immediately after registering for services or any time thereafter. The email address may also be provided for the duration of the user's registration for services, or may be terminated/reassigned after a predetermined period of time.

FIG. 2 shows an exemplary general telephone system that includes a set of instructions for accessing customer support. The user may be located at the site of any of, for example, a landline telephone 220, a VoIP-enabled telephone 230, a wireless/cellular/mobile telephone 240 or any other device usable for wired or wireless telephony. The landline telephone 220 is connected to a calling switch 222, which is controlled by a calling network controller 223. The calling switch 222 is in turn connected to or is part of the PSTN 224, which in addition to being connectable to the internet 234 and/or the intermediate network, is connected to a receiving switch 226 (which may also be a part of the PSTN itself). The receiving switch 226 is controlled by a receiving network controller 227, and is connected to a receiving landline telephone 228, such that the receiving landline telephone is configured to receive a call from, for example, the calling telephone 220, the VoIP-enabled telephone 230 and/or the cellular/mobile telephone 240.

The VoIP telephone 230 is connected to a network interface device 140, including a calling router 232, which is in turn connected to network 101 (including the internet 234). As discussed above, the PSTN 224 and/or the intermediate network 244 may be connectable to the internet 234. A receiving router 236 is connected to the internet 234, and the receiving router is also connected to a receiving VoIP telephone 238, such that the receiving landline telephone is configured to receive a call from, for example, the calling telephone 220, the calling VoIP-enabled telephone 230 and/or the calling cellular/mobile telephone 240.

Calling cellular telephone 240 is connected to a calling cell tower 242, which is in turn connected to the intermediate network 244. In addition to being connectable to the internet 234 and/or the PSTN, the intermediate network 244 is connected to a receiving cell tower 246. The receiving cell tower 246 is in turn connected to a receiving cellular telephone 248, such that the receiving cellular telephone is configured to receive a call from, for example, the calling telephone 220, the calling VoIP-enabled telephone 230 and/or calling the cellular/mobile telephone 240.

The receiving telephones 228, 238 and 248 are customer support telephones and can receive calls from virtually any type of communications device, including the calling telephone 220, the calling VoIP-enabled telephone 230 and/or calling the cellular/mobile telephone 240. As discussed above, the customer support telephones 228, 238 and 248 may be automated with robotic voice response and/or may also provide live manned human support.

It is also noted that as shown in FIG. 2, the landline telephone system 220-228, the VoIP telephone system 230-238 and/or the cellular telephone system 240-248 may be integrated, so that a call from any type of telephone system can be answered by any other type of telephone system.

Further, while single elements 200-248 are shown in FIG. 2 for purposes of simplicity, it should be well-understood by those of skill in the art that a plurality of such elements may be used to connect plural callers to plural customer service sites/phones.

Following the completion of the initial telephone service (including wireless/cellular telephone service, VoIP telephone service and/or landline telephone service and the like) order entry, a phone number is assigned (either immediately or after a predetermined period of time) to the customer and appropriate service elements are automatically put into place to support customer care access.

Should the user desire to contact customer support, but the user does not have the main customer support telephone number, the user uses all or part of his or her own telephone number to contact customer support. For example, if a user's number is NPANXXXXXX, the user would call this number (or possibly NXXXXXX or XXXX either alone or in combination with a series of other numbers, depending on the size of the service area) from his or her own telephone or from any other telephone. In related art telephone systems, when a user calls his or her own telephone number from his or her own telephone, a busy signal is generated or the call is forwarded to voicemail. Upon calling all or part of his or her own telephone number from his or her own phone, (rather than hearing a busy signal or being forwarded to voicemail), the user would then be directly connected to customer support in the form of automated with robotic voice response and/or live manned human support. When all or part of the user's own telephone number is called from another telephone (such as a phone other than that assigned to the called number), the caller is directed to customer support, whereupon the caller may obtain status, make changes in service and/or to speak with a customer support representative for the full spectrum of telephony (fixed/VoIP/Mobile), internet and/or video services. For security purposes, the user may be required to provide a PIN or password to prevent unauthorized individuals from accessing customer support via the user's telephone number.

After a predetermined duration following the service order, the automatic forwarding to customer service of a call to the user's phone number may end, and the calls to the user's phone number are then handled in a customary fashion.

Figure 5:
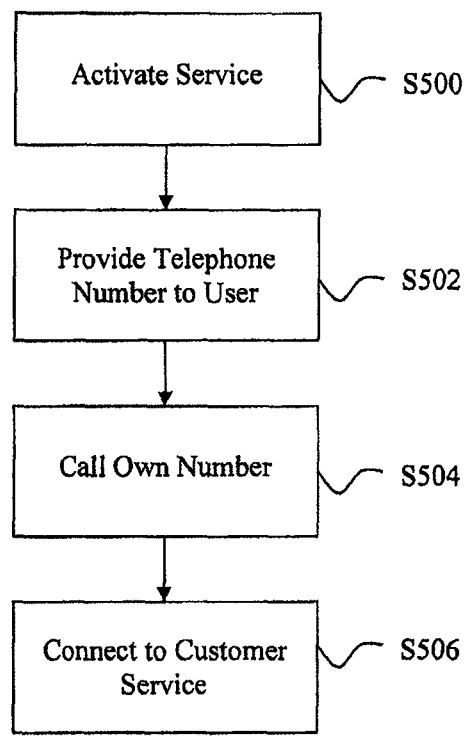
FIG. 5 shows a flowchart of a method of contacting a customer service, according to a third aspect of the present disclosure.

FIG. 5 shows a flowchart showing how customer may be accessed by a user. At step S500 the user signs up for telephone service, which may also include any of the other above-mentioned services, and at step S502 is thereafter provided with a telephone number. At this point the telephone service is set up. Such setup may be performed by a setter, which is preferably located in the processor 110 (shown in FIG. 1), although those of skill in the art should appreciate that any suitable element separate from or in addition to a setter may be used, and should also appreciate that the setter may be positioned in any suitable location separate from or in addition to the processor 110. At step S504, the user call his or her own number (or a portion thereof). At step S506, the user is connected to customer support. At this point the user accesses customer support. Such access may be performed by the accessor, which is preferably located in the processor 110 (shown in FIG. 1), although those of skill in the art should appreciate that any suitable element different from or in addition to the accessor may be used, and should also appreciate that the accessor may be positioned in any suitable location separate from or in addition to the processor 110. As discussed above, the user may call all or a portion of his or her own number from his or her own phone or from another telephone, including the calling phones 220, 230, 240 of FIG. 2. Further, the call may be connected to any receiving telephone answering site, including but the receiving phones 228, 238, 248 of FIG. 2.

Figure 6:
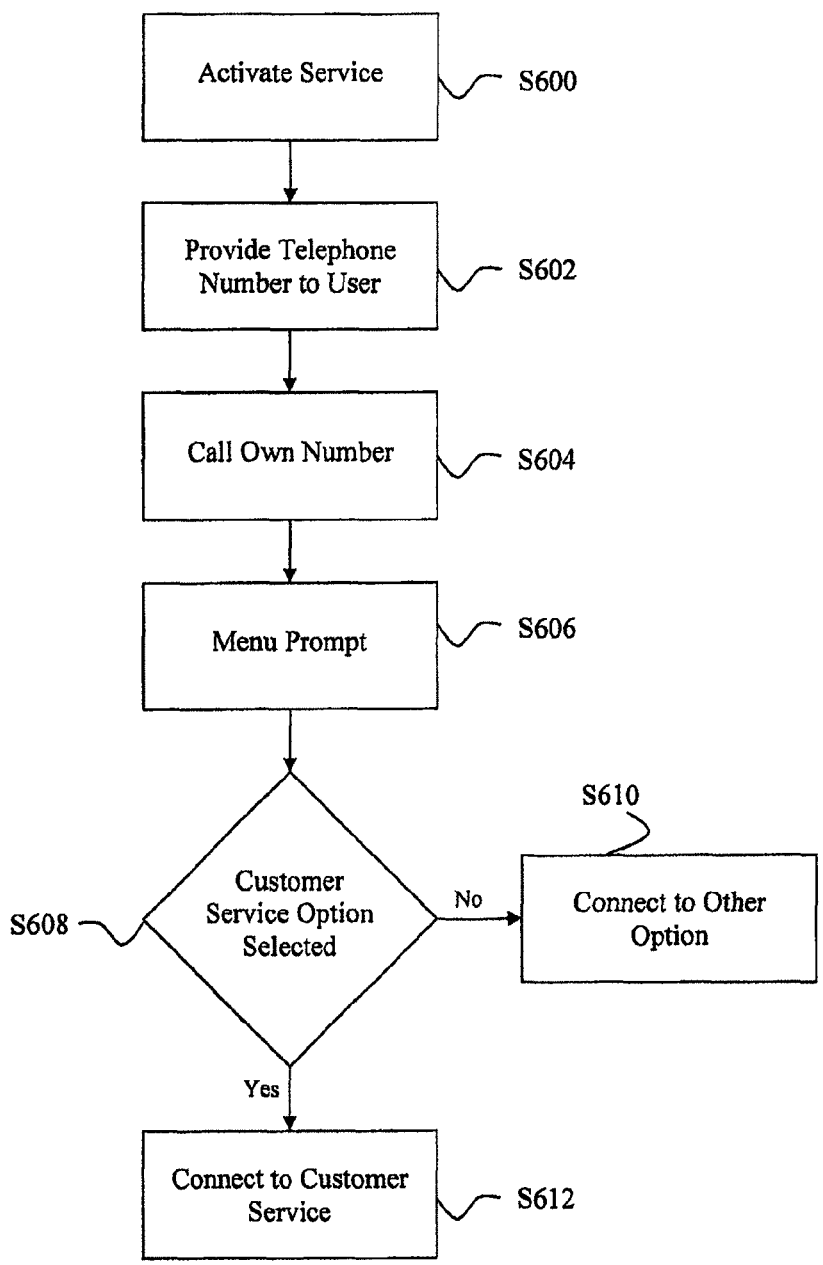
FIG. 6 shows a flowchart of a method of contacting a customer service, according to a fourth aspect of the present disclosure.

FIG. 6 shows a flowchart showing another way for a user to access customer service. At step S600 the user signs up for telephone service, which may also include any of the other above-mentioned services, and at step S602 is thereafter provided with a telephone number. At step S604, the user call his or her own number (or a portion thereof). At step S606, the user is provided with an automated menu of options, including an option to connect to customer service. Other options may include connecting to voice mail and call handling options such as call forwarding and the like. At step S608 the system checks which option the user selects. If, at step S608, the user wishes to connect to another option (an option other than connecting to customer service) he or she may press a key and/or give voice instructions, upon which, at step S610 the user is connected to an option other than customer service. If, however, at step S608, the user wishes to connect to customer service he or she may press a key and/or give voice instructions, upon which, at step S612 the user is connected to customer support. As discussed above, the user may call all or a portion of his or her own number from his or her own phone or from another telephone, including the calling phones 220, 230, 240 of FIG. 2. Further, the call may be connected to any receiving telephone answering site, including the receiving phones 228, 238, 248 of FIG. 2.

After a predetermined duration following the service order, the aforementioned customer service menu prompt feature may be terminated, and the calls to the user's phone number are then handled in a customary fashion. Alternatively, this customer service menu prompt may remain in place for the duration of the user's subscription to the service provider's services.

Accordingly, the present disclosure enables customer support (either manned or automated) to be provided to a user immediately (or sometime thereafter) following the initial processing of the customer order. The present disclosure further develops a solution that crosses service media and status boundaries and becomes intuitive for all users in a manner similar to what 611 does for many telephony service providers.

Further, should service issues arise during the pending order interval or after service delivery, and should the customer need to contact the telecommunications provider over a feature preference or a scheduling issue and doesn't have the provider's customer service telephone number on hand and is not sure how to go about getting it conveniently, a non-limiting feature of the present disclosure allows the customer to intuitively contact customer support using all or part of the customer's own telephone number, username and/or email address.

Such intuitive and easy access to customer care results in increased customer contact and loyalty through the implementation of a non-limiting feature of the present disclosure, thereby increasing corporate revenue.

Using a non-limiting feature of the present disclosure, the customer has access to customer care resources immediately upon completion of the initial order entry, thereby stimulating the customer's interest and loyalty. The customer need only record and/or remember their new telephone number, username and/or email address to obtain service from the provider's customer support system. The customer will thus be more inclined to contact the provider for service enhancements. Promotional elements and notifications may also be incorporated into the prompting, email or web site.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (including VoIP, TCP/IP, UDP/IP, HTML, HTTP) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for providing user support, comprising:
   a setter configured to set up at least one communication service for a user and to provide a unique communication identifier character string to access the at least one communication service; and
   an accessor configured to provide access only between the user and the user support prior to an activation of the at least one communication service by providing a unique user support identifier character string to the user prior to the activation of the at least one communication service, the user support identifier character string comprising at least a portion of the unique communication identifier character string.

2. The system of claim 1, wherein:
   the at least one communication service includes internet access; and
   the unique communication identifier character string includes at least a username of the user's email address.

3. The system of claim 2, wherein the unique user support identifier character string is a Uniform Resource Locator.

4. The system of claim 2, wherein the unique user support identifier character string is an email address different from the user's email address.

5. The system of claim 1, wherein
   the at least one communication service includes telephone services; and
   the unique communication identifier character string includes the user's telephone number.

6. The system of claim 5, wherein the unique user support identifier is a Uniform Resource Locator.

7. The system of claim 5, wherein the unique user support identifier is an email address.

8. The system of claim 5, wherein the unique user support identifier is the same as the user's telephone number.

9. The system of claim 1, wherein the user support identifier character string comprises the entire unique communication identifier character string.

10. A method of providing user support, comprising:
    setting up at least one communication service for a user and providing a unique communication identifier character string to access the at least one communication service; and
    providing access only between the user and the user support prior to an activation of the at least one communication service by providing a unique user support identifier character string to the user prior to the activation of the at least one communication service, the user support identifier character string comprising at least a portion of the unique communication identifier character string.

11. The method of claim 10, wherein
    the at least one communication service includes telephone services; and
    the unique communication identifier character string includes the user's telephone number.

12. The method of claim 11, wherein the unique user support identifier represents a resource available on a network.

13. The method of claim 11, wherein the unique user support identifier is an electronic mail address.

14. The method of claim 11, wherein the unique user support identifier is the same as the user's telephone number.

15. The method of claim 14, further comprising:
    during a first period of time after the setting up of the at least one communication service, directing a caller to user support upon calling the user's telephone number; and
    during a second period of time after the first period of time, providing a menu to the caller, the menu including a list of options including connecting to user support.

16. The method of claim 10, wherein:
    the at least one communication service includes internet access; and
    the unique communication identifier character string includes at least a username of the user's email address.

17. The method of claim 16, wherein the unique user support identifier character string represents a resource available on a network.

18. The method of claim 16, wherein the unique user support identifier character string is an email address different from the user's email address.

19. The method of claim 10, further comprising forwarding to the user, via at least one of short message service (SMS), pager, telephone or email, a response to the user's accessing user support.

20. The method of claim 19, wherein the response is automated.

21. The method of claim 10, wherein the user support identifier character string comprises the entire unique communication identifier character string.

22. The method of claim 16, wherein the unique communication identifier character string includes the user's entire email address.

23. The method of claim 11, wherein the telephone services include providing at least one of wireless telephony, landline telephony, voice-over-internet-protocol (VoIP) telephony.

24. A non-transitory computer readable medium for storing a computer program that provides user support, the computer readable medium, comprising:
    a setting code segment that sets up at least one communication service for a user and provides a unique communication identifier character string to access the at least one communication service; and
    an accessing code segment that provides access only between the user and the user support prior to an activation of the at least one communication service by providing a unique user support identifier character string to the user prior to the activation of the at least one communication service, the user support identifier character string comprising at least a portion of the unique communication identifier character string.

25. The non-transitory computer readable medium of claim 24, wherein:
the at least one communication service includes voice communication services, the voice communication services including at least one of wireless telephony, landline telephony and voice-over-internet-protocol telephony; and
the unique communication identifier character string includes the user's telephone number.

* * * * *